Patented Dec. 12, 1950

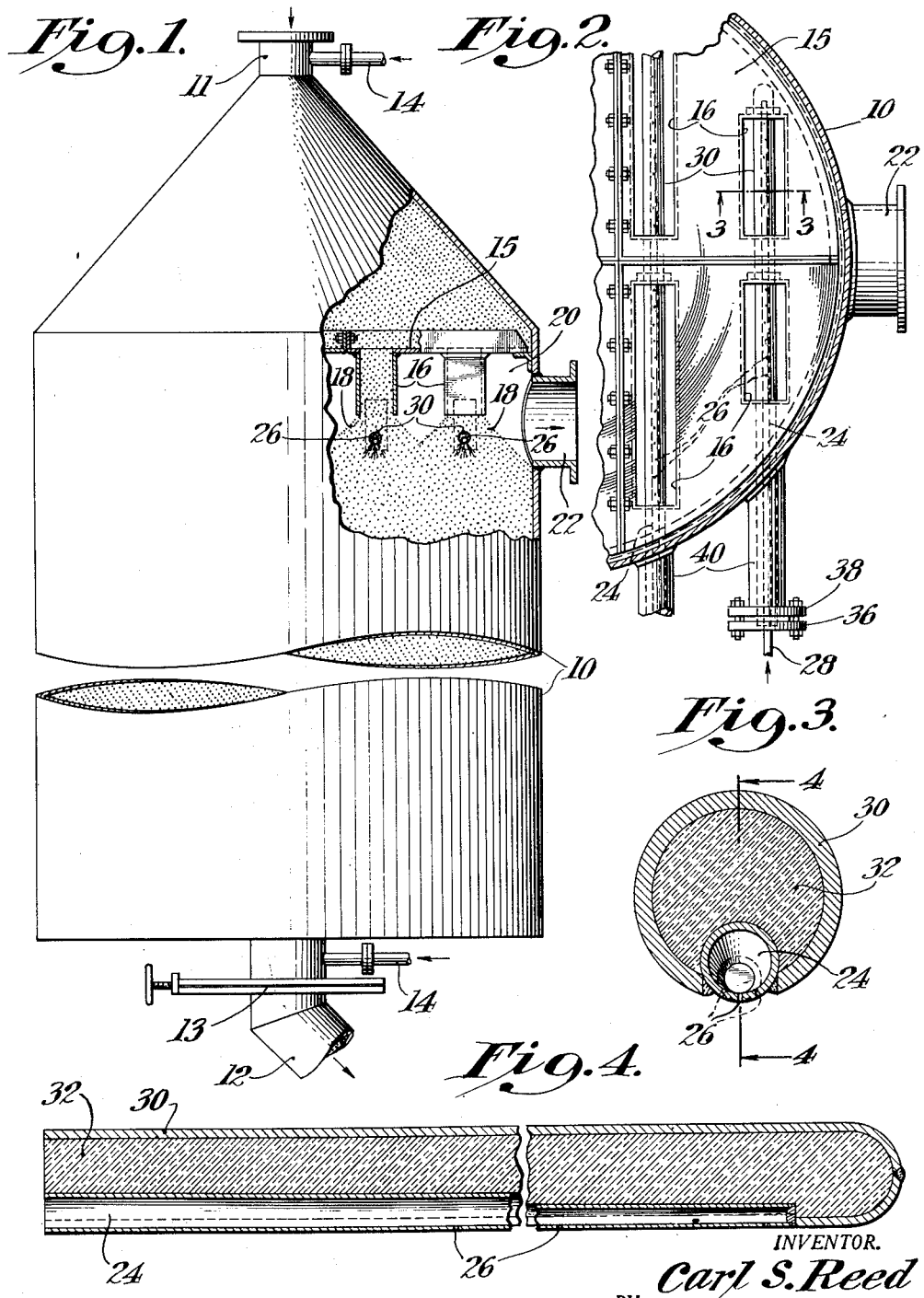

2,534,209

UNITED STATES PATENT OFFICE 2,534,209

HYDROCARBON FEED DISTRIBUTOR FOR CATALYTIC APPARATUS

Carl S. Reed, New York, N. Y., assignor to The Lummus Company, New York, N. Y., a corporation of Delaware Application January 30, 1948, Serial No. 5,470

3 Claims. (Cl. 23—288)

This invention relates particularly to improvements in the conversion of liquid phase hydrocarbons in the presence of a continually flowing discrete particle bed of contact material moving through a sealed reactor solely by gravity.

In such operations, it is advantageous to introduce the liquid feed below the surface of the flowing solids since this prevents any spraying or splashing of the heavy liquid onto the hot metal surfaces in the reactor and resulting formation of coke masses which would interfere with continuous operation. The submerged distributors would, however, be prone to coking the oil side due to the heat pickup from the highly preheated flowing solids.

It is the principal object of my invention to provide an improved distributor for applying liquid phase hydrocarbons uniformly throughout a continuously moving bed of granular contact material.

A further object of my invention is to provide an improved liquid distributor which will establish a uniform and continuous flow of liquid through extended conduits within a hot bed of granular contact material.

More particularly, it is an object of my invention to provide an insulating arrangement for liquid hydrocarbon distributors within a sealed reaction chamber through which preheated granular material flows by gravity, in which an insulating device prevents formation of coke and aids to maintain clean discharge openings.

Further objects and advantages of my invention will appear from the following description of a preferred form of embodiment thereof, taken in conjunction with the attached drawing illustrative thereof and in which;

Figure 1 is an elevation with parts in section of a hydrocarbon reactor.

Figure 2 is a partial horizontal cross section taken adjacent the top of the reactor of Figure 1.

Figure 3 is a vertical cross section through the distributor conduit and taken substantially along the line 3—3 of Figure 2.

Figure 4 is a vertical cross section taken substantially along the line 4—4 of Figure 3.

The technique of converting hydrocarbons in the presence of continuously moving, preheated beds of granular contact material moving downward in columnar form solely by gravity, is well established. In such case the contact material is continuously added to a vertical reactor such as shown at 10 of Figure 1 through inlet opening 11 and the contact material is continuously removed through the outlet 12 at the bottom. Slide valve 13 may control this outlet and sealing steam may be used both at the top and bottom outlets through line 14.

The contact material may be any one of the known catalytic materials including bauxite or alumina or others or may be only a heat carrying material such as coke. An example of a specific reactor operation is in the production of gas oil and coke from heavy crudes. Similar problems exist also in the catalytic conversion of lighter hydrocarbons in the production of gasoline as well as in certain chemical reactions.

A reactor of this type is preferably provided with an upper baffle generally indicated at 15 having a plurality of downwardly projecting chute or distributor members 16 to uniformly distribute the contact material across the reactor. These may be tubular or rectangular as shown in Figure 2. In such case flowing piles or cones 18 of contact material will form, such piles or cones joining to form vapor release spaces 20 which are interconnected to the reactant outlet 22. Alternatively a reactant outlet may be placed in any lower part of the reactor if desired.

In my preferred apparatus, the liquid feed is applied to the contact material in the flowing piles 18 by providing a series of distributor pipes 24 which are suitably perforated along their lower sides, as shown at 26 in Figure 4. These pipes are conveniently connected to external hydrocarbon feed means generally indicated at 28. Usually they extend substantially horizontal and are spaced across the horizontal cross section of the reactor in a manner so that uniform distribution of liquid over the entire bed can be accomplished.

In view of the fact that the contact material which passes downwardly through the reactor may be as hot as 1200° F. or more, there has been observed a tendency of the liquid to react within the distributor pipes. In the case of hydrocarbon feed the charge is usually near its vaporization point and although it is partially liquid the direct contact of the hot particles on the wall of the distributor pipe is likely to cause objectionable coking.

As shown in Figure 3, I provide an insulating shield or casing which preferably consists of a tubular casing 30, which casing is closed at the inner end and slotted at the bottom to expose the feed conduit 24. The feed conduit 24 is of substantially smaller diameter leaving an intervening space which may be filled with a suitable insulating material indicated at 32. This will not only prevent flow of heat by conduction but will also prevent the flow of radiant heat to feed conduit 24.

If the feed conduit 24 is substantially tangent to the shielding casing 30 and if the casing 30 has a sufficiently large diameter, there will not only be adequate insulating space which will satisfactorily prevent the surface of feed conduit 24 from becoming overheated, but there will be the further advantage that the vapors from the discharged liquid will be prevented from coking the conduits. In addition, the openings 26 in the conduit 24 are shielded in such a manner that the continuously moving granular material will not tend to clog them. The casing or shield 30 may be tack welded to the feed conduit 24 to minimize flow of heat by conduction.

The preferred arrangement illustrated in Fig. 4 is one in which the apertured lower side of the feed conduit 24 projects into the elongated bottom slot of the much larger tubular casing 30 as a substantial continuation of the outer bottom surface thereof.

I find that in reactors of large diameter as for example 10 feet or more, that it may be helpful to taper the feed pipes 24 as shown in Figure 4 to more nearly establish uniform flow throughout the length of the conduit to prevent any substantial reaction from occurring.

If desired, the conduits 24 and the shielding conduits 30 may be made removable by mounting on a flange 36, which in turn may be bolted to flange 38 on nozzle 40. In such case cleaning and inspection by the removal of the feed unit may be readily accomplished.

From a consideration of Figures 3 and 4 it will be observed that the insulating material 32 covers the top and the major parts of the sides of the feed conduit 24 as well as the inner end thereof so that but little more than the apertured portion is exposed. The tubular casing 30 receives the conduit 24 in common bottom tangent relation and extends laterally and upwards beyond said conduit, leaving only the apertured portion exposed.

While I have shown and described a preferred form of embodiment of my invention, I am aware that modifications may be made thereto and I desire to include such modifications that come within the scope and spirit of the description herein and of the claims appended hereinafter.

I claim:

1. In combination with an upright reactor chamber for effecting a chemical reaction in the presence of a continuously moving bed of heated granular particles of contact material in gravity packed columnar form, which reactor chamber has an inlet and an outlet for the contact material, and an outlet intermediate thereof for the products of the reaction: improved feed and distributing means for liquid phase material to be reacted comprising a straight tubular conduit extending substantially horizontal into the reactor chamber and spaced below the top of the reactor chamber whereby it is normally below the top surface of the bed, said conduit having a plurality of feed distributing apertures spaced along the lower side thereof, a tubular casing having a closed inner end portion and being of much larger diameter than the conduit, said casing receiving said conduit and having an elongated bottom slot into which the apertured lower side of said conduit projects as a substantial continuation of the outer bottom surface of the tubular casing, and a heat insulating material filling the space between the conduit and the casing.

2. In combination with an upright reactor chamber for effecting a chemical reaction in the presence of a continuously moving bed of heated granular particles of contact material in gravity packed columnar form, which reactor chamber has an inlet and an outlet for the contact material, and an outlet intermediate thereof for the products of the reaction: improved feed and distributing means for liquid phase material to be reacted comprising a straight tubular conduit extending substantially horizontal into the reactor chamber and spaced below the top of the reactor chamber whereby it is normally below the top surface of the bed, said conduit having a plurality of feed distributing apertures spaced along the lower side thereof, a tubular casing having a closed inner end portion and being of much larger diameter than the conduit, said casing receiving said conduit and having an elongated bottom slot into which the apertured lower side of said conduit projects as a substantial continuation of the outer bottom surface of the tubular casing, tack welding integrally joining the conduit to the slot portion of the casing to minimize heat transfer by conduction, and a heat insulating material filling the space between the conduit and the casing.

3. In combination with an upright reactor chamber for effecting a chemical reaction in the presence of a continuously moving bed of heated granular particles of contact material in gravity packed columnar form, which reactor chamber has an inlet and an outlet for the contact material, and an outlet intermediate thereof for the products of the reaction: improved feed and distributing means for liquid phase material to be reacted comprising a straight tubular conduit extending substantially horizontal into and across the reactor chamber and spaced below the top of the reactor chamber whereby it is normally below the top surface of the bed, said conduit being progressively reduced in cross-sectional area toward its inner end and having a plurality of feed distributing apertures spaced along the lower side thereof, a tubular casing having a closed inner end portion and being of much larger diameter than the conduit, said casing receiving said conduit and having an elongated bottom slot into which the apertured lower side of said conduit projects as a substantial continuation of the outer bottom surface of the tubular casing, and a heat insulating material filling the space between the conduit and the casing.

CARL S. REED.

REFERENCES CITED

The following references are of record in the file of this patent:

UNITED STATES PATENTS

| Number | Name | Date |
| --- | --- | --- |
| 477,153 | Pielsticker | June 14, 1892 |
| 1,668,309 | Etnyre | May 1, 1928 |
| 2,432,344 | Sinclair | Dec. 9, 1947 |
| 2,482,137 | Schutte | Sept. 20, 1949 |
| 2,482,138 | Schutte | Sept. 20, 1949 |